US011548102B2

(12) United States Patent
Roberts et al.

(10) Patent No.: US 11,548,102 B2
(45) Date of Patent: Jan. 10, 2023

(54) METHOD FOR REPAIRING COMPOSITE COMPONENTS USING A PLUG

(71) Applicant: General Electric Company, Schenectady, NY (US)

(72) Inventors: Herbert Chidsey Roberts, Middletown, OH (US); Christopher James Scott, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 100 days.

(21) Appl. No.: 16/944,914

(22) Filed: Jul. 31, 2020

(65) Prior Publication Data

US 2022/0032408 A1 Feb. 3, 2022

(51) Int. Cl.
| | | |
|---|---|---|
| *B23P 6/00* | (2006.01) | |
| *B29C 73/06* | (2006.01) | |
| *B29C 73/16* | (2006.01) | |
| *F01D 25/00* | (2006.01) | |
| *B29L 31/08* | (2006.01) | |

(52) U.S. Cl.
CPC ............ *B23P 6/007* (2013.01); *B23P 6/002* (2013.01); *B29C 73/06* (2013.01); *B29C 73/166* (2013.01); *F01D 25/00* (2013.01); *B29L 2031/082* (2013.01); *F05D 2220/32* (2013.01); *F05D 2230/80* (2013.01); *F05D 2300/603* (2013.01)

(58) Field of Classification Search
CPC ......... B23P 6/002; B29C 73/04; B29C 73/06; Y10T 29/49318; Y10T 29/49732; Y10T 29/49734; Y10T 29/49746
See application file for complete search history.

(56) References Cited

U.S. PATENT DOCUMENTS

| | | | | |
|---|---|---|---|---|
| 4,132,554 | A * | 1/1979 | Saito | C04B 35/5831 51/307 |
| 4,726,104 | A * | 2/1988 | Foster | F01D 5/20 29/DIG. 48 |
| 4,743,462 | A * | 5/1988 | Radzavich | C23C 4/01 427/300 |
| 4,978,404 | A | 12/1990 | Westerman, Jr. | |
| 5,511,721 | A * | 4/1996 | Demo | B23K 31/02 228/119 |
| 5,902,647 | A * | 5/1999 | Venkataramani | B05D 1/32 427/454 |
| 5,928,448 | A * | 7/1999 | Daws | B23P 6/00 156/92 |
| 5,985,122 | A * | 11/1999 | Conner | C25D 5/022 205/135 |
| 6,321,449 | B2 | 11/2001 | Zhao et al. | |
| 6,820,334 | B2 | 11/2004 | Kebbede et al. | |
| 6,884,476 | B2 * | 4/2005 | Pfaendtner | C23C 14/04 427/255.18 |

(Continued)

*Primary Examiner* — Jason L Vaughan
(74) *Attorney, Agent, or Firm* — Dority & Manning, P.A.

(57) ABSTRACT

A method for repairing composite components includes installing a plug within a feature defined by a composite component, with the plug being formed from one or more neutral materials. Furthermore, the method includes infiltrating the composite component with an infiltrant to densify a repair region of the composite component, with the plug blocking a flow of the infiltrant into the feature. Moreover, after infiltrating the composite component, the method includes removing the plug from the feature.

20 Claims, 6 Drawing Sheets

(56) References Cited

U.S. PATENT DOCUMENTS

| | | | |
|---|---|---|---|
| 7,192,622 B2 * | 3/2007 | Fernihough | C23C 16/042 |
| | | | 427/259 |
| 8,528,208 B2 | 9/2013 | Rebak et al. | |
| 8,533,949 B2 | 9/2013 | Bunker | |
| 8,601,691 B2 | 12/2013 | Rebak et al. | |
| 8,739,404 B2 | 6/2014 | Bunker et al. | |
| 8,753,071 B2 | 6/2014 | Bunker | |
| 8,945,321 B2 * | 2/2015 | Hanks | B29C 70/443 |
| | | | 156/286 |
| 9,382,018 B2 | 7/2016 | Roux et al. | |
| 9,512,505 B2 * | 12/2016 | Weaver | C04B 41/009 |
| 9,579,873 B2 * | 2/2017 | Hanks | B29C 70/544 |
| 9,701,072 B2 * | 7/2017 | Corman | C04B 41/85 |
| 10,005,160 B2 | 6/2018 | Bunker | |
| 10,030,305 B2 * | 7/2018 | Weaver | F01D 5/005 |
| 10,150,188 B1 * | 12/2018 | Parolini | B05D 5/005 |
| 10,562,210 B2 | 2/2020 | Parolini et al. | |
| 10,737,986 B2 * | 8/2020 | Roberts | C04B 37/003 |
| 11,034,106 B2 * | 6/2021 | Mega | B29C 73/04 |
| 11,097,384 B2 * | 8/2021 | Hafner | F01D 9/04 |
| 2003/0129061 A1 | 7/2003 | Finn et al. | |
| 2017/0029088 A1 | 2/2017 | Gruner | |
| 2017/0145560 A1 * | 5/2017 | Weaver | F01D 5/284 |
| 2019/0344298 A1 * | 11/2019 | Czarnik | B60B 7/02 |
| 2020/0086593 A1 | 3/2020 | Whitworth et al. | |

* cited by examiner

METHOD FOR REPAIRING COMPOSITE COMPONENTS USING A PLUG

FIELD

The present disclosure generally pertains to composite components, such as turbomachine components, and, more specifically, to methods for repairing composite components.

BACKGROUND

In recent years, the use of non-traditional high temperature materials, such as ceramic matrix composite (CMC) materials, in gas turbine engines has grown dramatically. Specifically, there is strong interest in replacing metal alloy components within the combustion and turbine sections of a gas turbine engine with CMC components. CMC materials can withstand higher operating temperatures than metal alloys. Higher operating temperatures, in turn, increase the efficiency of the gas turbine engine. Moreover, CMC components require less cooling than metallic components. Additionally, CMC materials are lighter than metallic components and may reduce the structural demands on the engine.

However, gas turbine components formed from CMC materials can be quite expensive. In this respect, when a CMC gas turbine component becomes worn or damaged, it is desirable to repair, rather than replace, the component. As such, methods of repairing CMC components have been developed. For example, the worn or damaged portion(s) of a CMC component may be removed and replaced with new CMC material. While such methods work well, improvements are needed.

Accordingly, an improved method for repairing composite components would be welcomed in the technology.

BRIEF DESCRIPTION

Aspects and advantages of the invention will be set forth in part in the following description, or may be obvious from the description, or may be learned through practice of the invention.

In one aspect, the present subject matter is directed to a method for repairing composite components. The method includes installing a plug within a feature defined by a composite component, with the plug formed from one or more neutral materials. Furthermore, the method includes infiltrating the composite component with an infiltrant to densify a repair region of the composite component, with the plug blocking a flow of the infiltrant into the feature. Additionally, after infiltrating the composite component, the method includes removing the plug from the feature.

In another aspect, the present subject matter is directed to a method for repairing composite turbomachine components. The method includes installing a plug within a feature defined by a composite turbomachine component, with the plug formed from one or more neutral and bond resistant materials. Moreover, the method includes infiltrating the composite turbomachine component with an infiltrant to densify a repair region of the composite turbomachine component, with the plug blocking a flow of the infiltrant into the feature. In addition, after infiltrating the composite turbomachine component, the method includes removing the plug from the feature.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
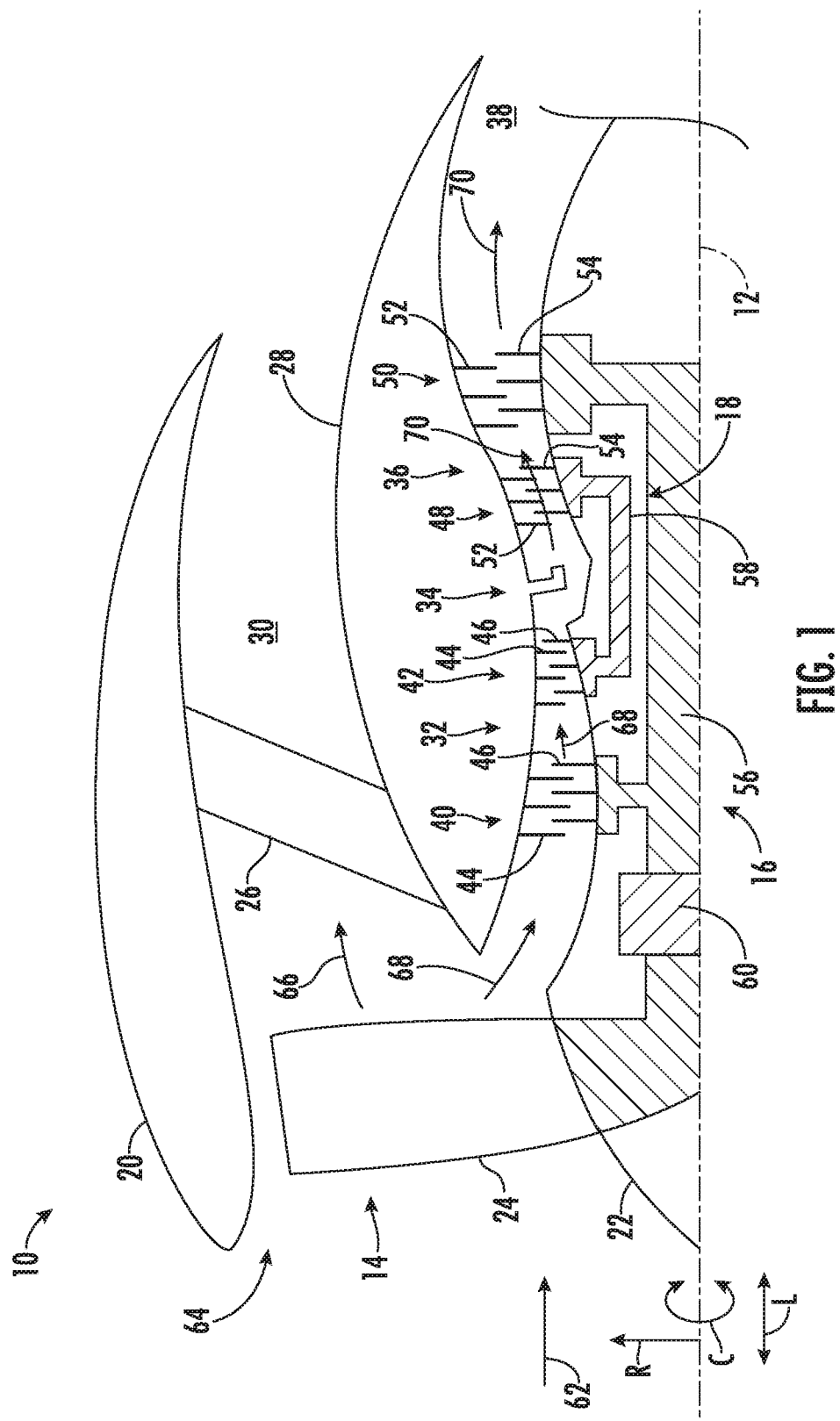
FIG. 1 is a schematic cross-sectional view of one embodiment of a gas turbine engine.

Repeat use of reference characters in the present specification and drawings is intended to represent the same or analogous features or elements of the present invention.

DETAILED DESCRIPTION

Reference now will be made in detail to exemplary embodiments of the presently disclosed subject matter, one or more examples of which are illustrated in the drawings. Each example is provided by way of explanation and should not be interpreted as limiting the present disclosure. In fact, it will be apparent to those skilled in the art that various modifications and variations can be made in the present disclosure without departing from the scope or spirit of the present disclosure. For instance, features illustrated or described as part of one embodiment can be used with another embodiment to yield a still further embodiment. Thus, it is intended that the present disclosure covers such modifications and variations as come within the scope of the appended claims and their equivalents.

As used herein, the terms "first", "second", and "third" may be used interchangeably to distinguish one component from another and are not intended to signify location or importance of the individual components.

Furthermore, the terms "upstream" and "downstream" refer to the relative direction with respect to fluid flow in a fluid pathway. For example, "upstream" refers to the direction from which the fluid flows, and "downstream" refers to the direction to which the fluid flows.

Additionally, the terms "low," "high," or their respective comparative degrees (e.g., lower, higher, where applicable) each refer to relative speeds within an engine, unless otherwise specified. For example, a "low-pressure turbine" operates at a pressure generally lower than a "high-pressure turbine." Alternatively, unless otherwise specified, the aforementioned terms may be understood in their superlative degree. For example, a "low-pressure turbine" may refer to the lowest maximum pressure turbine within a turbine section, and a "high-pressure turbine" may refer to the highest maximum pressure turbine within the turbine section.

In general, the present subject matter is directed to a method for repairing composite components. More specifically, when repairing a composite component, worn or damaged material may be removed (e.g., via machining, grinding, etc.) from a repair region of the component. Thereafter, repair material (e.g., a fiber preform, a fiber tape, and/or the like) may be placed within the repair region in place of the removed material. As will be described below, the repair material is infiltrated (e.g., via melt infiltration) to densify the repaired region of the component, thereby forming new composite material in place of the worn/damaged material. For example, the disclosed method may be used to repair various turbomachine components, such as ceramic matrix composite (CMC) gas turbine engine blades, vanes, shroud blocks, and/or the like.

The disclosed method includes installing a plug(s) within a feature(s) defined by the composite component. More specifically, the composite component may define various features, such as holes, slots, and the like. During infiltration, these features may become filled with infiltrant, which must subsequently be removed. Such removal may damage the features, thereby requiring expensive and time-consuming rework. However, installing the plug(s) within the feature(s) before infiltration blocks the flow of the infiltrant into such feature(s). As such, the plug(s) is formed from one or more neutral materials, such as boron nitride or polytetrafluoroethylene. In one embodiment, a preformed plug(s) is installed within the feature(s) of the component. In another embodiment, one or more neutral particulate materials are compacted within the feature(s) of the component to form the plug(s). After infiltration, the method includes removing the plug(s) from the feature(s).

Referring now to the drawings, FIG. 1 is a schematic cross-sectional view of one embodiment of a gas turbine engine 10. In the illustrated embodiment, the engine 10 is configured as a high-bypass turbofan engine. However, in alternative embodiments, the engine 10 may be configured as a propfan engine, a turbojet engine, a turboprop engine, a turboshaft gas turbine engine, or any other suitable type of gas turbine engine.

As shown in FIG. 1, the engine 10 defines a longitudinal direction L, a radial direction R, and a circumferential direction C. In general, the longitudinal direction L extends parallel to an axial centerline 12 of the engine 10, the radial direction R extends orthogonally outward from the axial centerline 12, and the circumferential direction C extends generally concentrically around the axial centerline 12.

In general, the engine 10 includes a fan 14, a low-pressure (LP) spool 16, and a high pressure (HP) spool 18 at least partially encased by an annular nacelle 20. More specifically, the fan 14 may include a fan rotor 22 and a plurality of fan blades 24 (one is shown) coupled to the fan rotor 22. In this respect, the fan blades 24 are spaced apart from each other along the circumferential direction C and extend outward from the fan rotor 22 along the radial direction R. Moreover, the LP and HP spools 16, 18 are positioned downstream from the fan 14 along the axial centerline 12 (i.e., in the longitudinal direction L). As shown, the LP spool 16 is rotatably coupled to the fan rotor 22, thereby permitting the LP spool 16 to rotate the fan 14. Additionally, a plurality of outlet guide vanes or struts 26 spaced apart from each other in the circumferential direction C extend between an outer casing 28 surrounding the LP and HP spools 16, 18 and the nacelle 20 along the radial direction R. As such, the struts 26 support the nacelle 20 relative to the outer casing 28 such that the outer casing 28 and the nacelle 18 define a bypass airflow passage 30 positioned therebetween.

The outer casing 28 generally surrounds or encases, in serial flow order, a compressor section 32, a combustion section 34, a turbine section 36, and an exhaust section 38. For example, in some embodiments, the compressor section 32 may include a low-pressure (LP) compressor 40 of the LP spool 16 and a high-pressure (HP) compressor 42 of the HP spool 18 positioned downstream from the LP compressor 40 along the axial centerline 12. Each compressor 40, 42 may, in turn, include one or more rows of stator vanes 44 interdigitated with one or more rows of compressor rotor blades 46. Moreover, in some embodiments, the turbine section 36 includes a high-pressure (HP) turbine 48 of the HP spool 18 and a low-pressure (LP) turbine 50 of the LP spool 16 positioned downstream from the HP turbine 48 along the axial centerline 12. Each turbine 48, 50 may, in turn, include one or more rows of stator vanes 52 interdigitated with one or more rows of turbine rotor blades 54.

Additionally, the LP spool 16 includes the low-pressure (LP) shaft 56 and the HP spool 18 includes a high pressure (HP) shaft 58 positioned concentrically around the LP shaft 56. In such embodiments, the HP shaft 58 rotatably couples the rotor blades 54 of the HP turbine 48 and the rotor blades 46 of the HP compressor 42 such that rotation of the HP turbine rotor blades 54 rotatably drives HP compressor rotor blades 46. As shown, the LP shaft 56 is directly coupled to the rotor blades 54 of the LP turbine 50 and the rotor blades 46 of the LP compressor 40. Furthermore, the LP shaft 56 is coupled to the fan 14 via a gearbox 60. In this respect, the rotation of the LP turbine rotor blades 54 rotatably drives the LP compressor rotor blades 46 and the fan blades 24.

In several embodiments, the engine 10 may generate thrust to propel an aircraft. More specifically, during operation, air (indicated by arrow 62) enters an inlet portion 64 of the engine 10. The fan 14 supplies a first portion (indicated by arrow 66) of the air 62 to the bypass airflow passage 30 and a second portion (indicated by arrow 68) of the air 62 to the compressor section 32. The second portion 68 of the air 62 first flows through the LP compressor 40 in which the rotor blades 46 therein progressively compress the second portion 68 of the air 62. Next, the second portion 68 of the air 62 flows through the HP compressor 42 in which the rotor blades 46 therein continue progressively compressing the second portion 68 of the air 62. The compressed second portion 68 of the air 62 is subsequently delivered to the combustion section 34. In the combustion section 34, the second portion 68 of the air 62 mixes with fuel and burns to generate high-temperature and high-pressure combustion gases 70. Thereafter, the combustion gases 70 flow through the HP turbine 48 which the HP turbine rotor blades 54 extract a first portion of kinetic and/or thermal energy therefrom. This energy extraction rotates the HP shaft 58, thereby driving the HP compressor 42. The combustion gases 70 then flow through the LP turbine 50 in which the LP turbine rotor blades 54 extract a second portion of kinetic and/or thermal energy therefrom. This energy extraction rotates the LP shaft 56, thereby driving the LP compressor 40 and the fan 14 via the gearbox 60. The combustion gases 70 then exit the engine 10 through the exhaust section 38.

Figure 2:
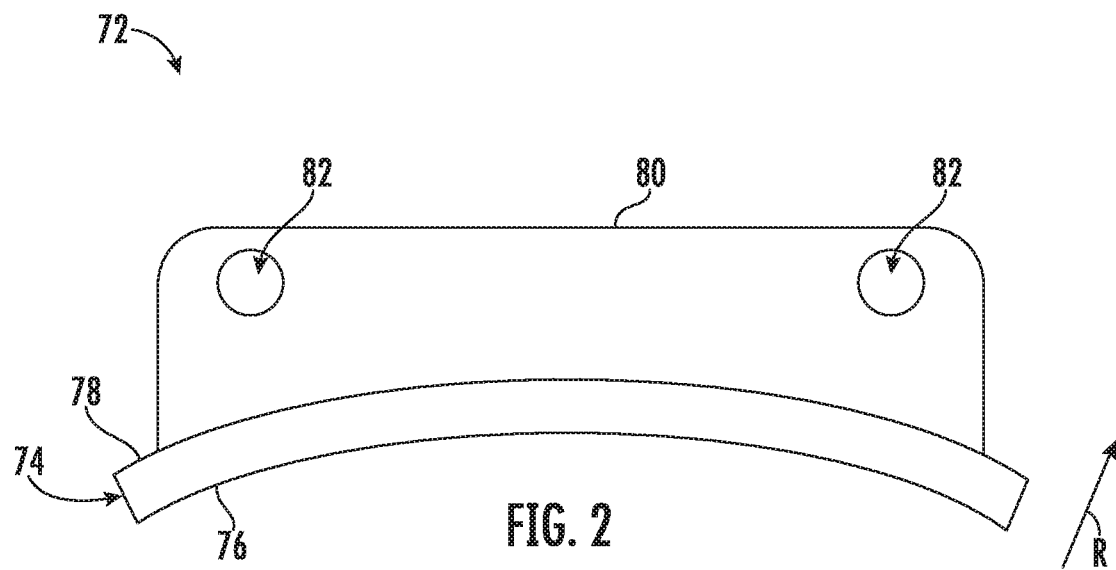
FIG. 2 is a side view of one embodiment of a shroud block of a gas turbine engine.

FIG. 2 is a side view of one embodiment of a shroud block 72 of the gas turbine engine 10. In general, several shroud blocks 72 are circumferentially arranged to form a shroud (not shown) enclosing or otherwise surrounding one of the rows of rotor blades 46 in the compressor section 32 or one of the rows of rotor blades 54 in the turbine section 36. As shown, the shroud block 72 includes an annular wall 74 extending between an inner surface 76 and an outer surface 78 in the radial direction R. The inner surface 76 is, in turn, positioned in close proximity to the tips of the corresponding blades 46, 54 to minimize the leakage of the air/combustion gases 68/70 past the blades 46, 54. Furthermore, the shroud 72 includes a pair of mounting rails 80 (one is shown). The rails 80 are spaced apart from each other in the longitudinal direction L and extend outward from the outer surface 78 of the annular wall 74 in the radial direction R. Moreover, each rail 80 defines a pair of mounting holes 82 for coupling the shroud block 72 to the outer casing 28 of the engine 10. However, in alternative embodiments, the shroud block 72 may have any other suitable configuration.

Additionally, one or more the components of the gas turbine engine 10 may be formed of a composite material, such as ceramic matrix composite (CMC) material. For example, in several embodiments, the compressor vanes 44, the compressor blades 46, the turbine vanes 52, the turbine blades 54, and shroud blocks 72 may be formed from CMC materials. However, in alternative embodiments, any other suitable components of the engine 10 may be formed by composite materials.

The configuration of the gas turbine engine 10 described above and shown in FIGS. 1 and 2 is provided only to place the present subject matter in an exemplary field of use. Thus, the present subject matter may be readily adaptable to any manner of gas turbine engine configuration, including other types of aviation-based gas turbine engines, marine-based gas turbine engines, and/or land-based/industrial gas turbine engines.

Figure 3:
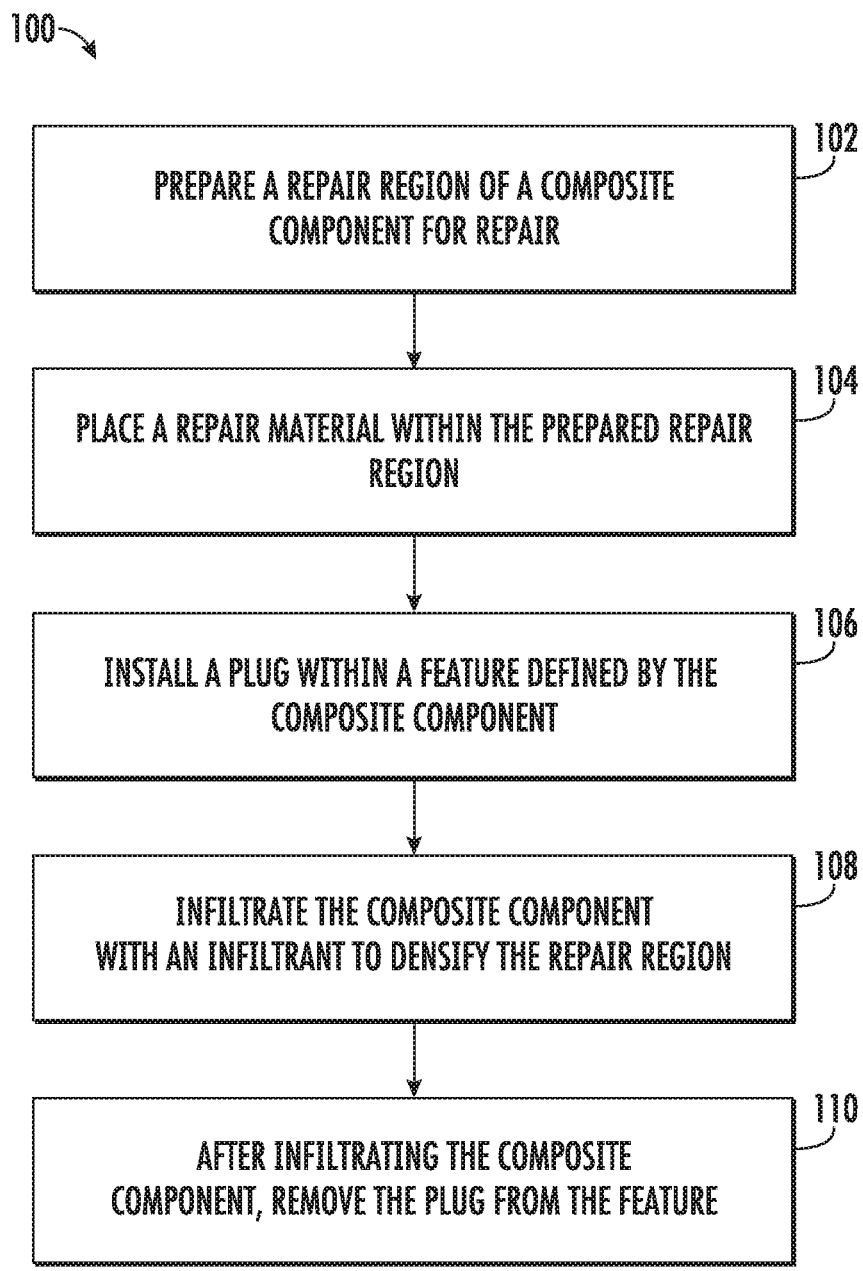
FIG. 3 is a flow diagram of one embodiment of a method for repairing composite components.

FIG. 3 is a flow diagram of one embodiment of a method 100 for repairing composite components. Although FIG. 3 depicts steps performed in a particular order, the disclosed methods are not limited to any particular order or arrangement. As such, the various steps of the disclosed methods can be omitted, rearranged, combined, and/or adapted in various ways without deviating from the scope of the present disclosure.

In general, the various steps of the method 100 will be described below in the context of repairing a composite component 200. For example, as will be described below, the composite component 200 may correspond to a composite component of the gas turbine engine 10. However, in alternative embodiments, the composite component 200 may correspond to any other suitable composite component.

Figure 4:
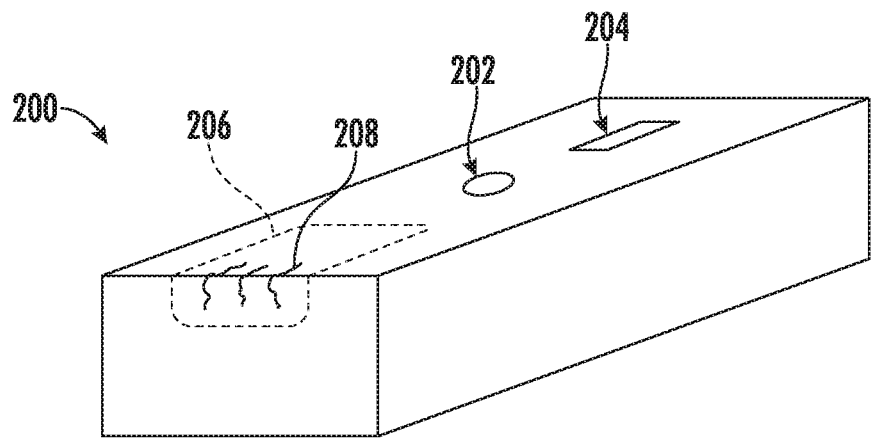
FIG. 4 is a perspective view of one embodiment of a composite component, particularly illustrating a repair region of the component prior to repair.

FIG. 4 is a perspective view of one embodiment of the composite component 200. In the general, the component 200 defines various features therein. More specifically, as shown, in the illustrated embodiment, the component 200 defines a hole 202 and a slot 204. For example, in one embodiment, the hole 202 may be a mounting hole (e.g., the hole 82 of the shroud block 72) configured to receive a fastener for use in mounting the component 200. Moreover, in one embodiment, the slot 204 may be configured to receive another component, such as a seal (not shown). However, in alternative embodiments, the component 200 may define any other suitable type or number of features therein, such as additional holes 202, additional slots 204, a channel(s) (not shown), a passage(s) (not shown), and/or the like.

Furthermore, as shown in FIG. 4, the composite component 200 includes a repair region 206. In general, the repair region 206 corresponds to a portion of the component 200 that will be repaired in accordance with the method 100. More specifically, the repair region 206 may be a worn or damaged portion of the component 200. For example, in the illustrated embodiment, the repair region 206 includes several cracks 208. Although the component 200 shown in FIG. 1 only includes one repair region 206, the component 200 may, in other embodiments, include any other suitable number of repair regions 206.

Moreover, the composite component 200 may be formed from any suitable composite material. For example, the composite material may be selected from the group consisting of, but not limited to, a ceramic matrix composite (CMC), a polymer matrix composite (PMC), a metal matrix composite (MMC), or a combination thereof. Suitable examples of matrix material for a CMC matrix is ceramic powder, including but not limited to, silicon carbide, aluminum-oxide, silicon oxide, and combinations thereof. Suitable examples of matrix material for a PMC include, but are not limited to, epoxy-based matrices, polyester-based matrices, and combinations thereof. Suitable examples of a MMC matrix material include, but are not limited to powder metals such as, but not limited to, aluminum or titanium capable of being melted into a continuous molten liquid metal which can encapsulate fibers present in the assembly, before being cooled into a solid ingot with incased fibers. The resulting MMC is a metal article with increased stiffness, and the metal portion (matrix) is the primary load caring element. For example, in one embodiment, the composite component 200 may be formed from a silicon carbide-silicon carbide (SiC—SiC) matrix composite.

Figure 5:
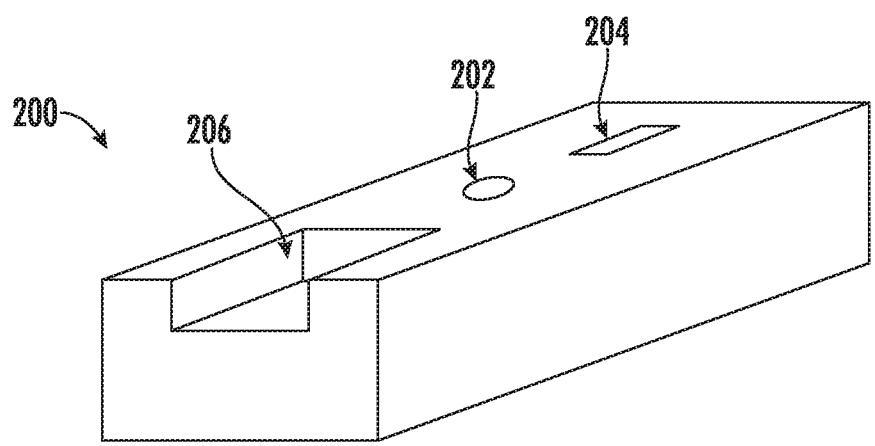
FIG. 5 is perspective view of the composite component shown in FIG. 4, particularly illustrating the repair region of the component after preparation for repair.

Referring again to FIG. 3, at (102), the method 100 may include preparing a repair region of a composite component for repair. Specifically, in several embodiments, at (102), the worn or damaged material of the repair region 206 (e.g., the portion of the component 200 containing the cracks 208) may be removed from the composite component 200 via machining, grinding, cutting, and/or the like. As shown in FIG. 5, upon completion of (102), the repair region 206 is a void where the worn/damaged material was originally present.

Figure 6:
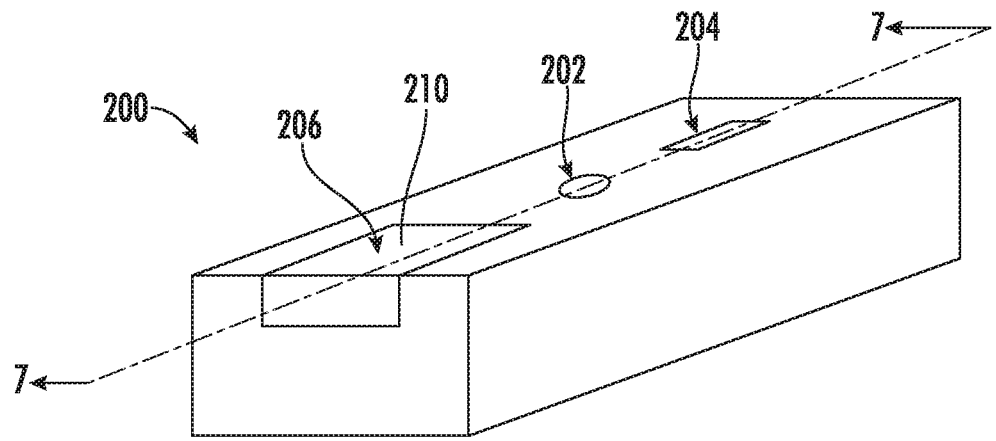
FIG. 6 is a perspective view of shown in FIGS. 4 and 5, particularly illustrating repair material placed within the repair region of the component.

Additionally, as shown in FIG. 3, at (104), the method 100 includes placing a repair material within the prepared repair region. For example, as shown in FIG. 6, repair material 210 may be placed with the void at prepared repair region 206 such that the repair material 210 occupies the space where the worn/damaged material was originally present. As will be described below, the repair material 210 will be infiltrated such that new composite material is formed in the repair region 206, thereby repairing the component 200. In this respect, the repair material 210 corresponds to a precursor material for the composite material from which the component 200 is formed. As such, the repair material 210 may include a plurality of fibers defining voids that receive the infiltrant. For example, in embodiments in which the component 200 is formed from a SiC—SiC matrix composite, the repair material 210 may correspond to a silicon carbide (SiC) fiber preform having the same shape and size as the void left in the repair region. However, in alternative embodiments, the repair material 210 may correspond to any other suitable composite precursor material, such as a fiber preform formed of another suitable material, fiber tapes, fiber mats, and the like.

Figure 7:
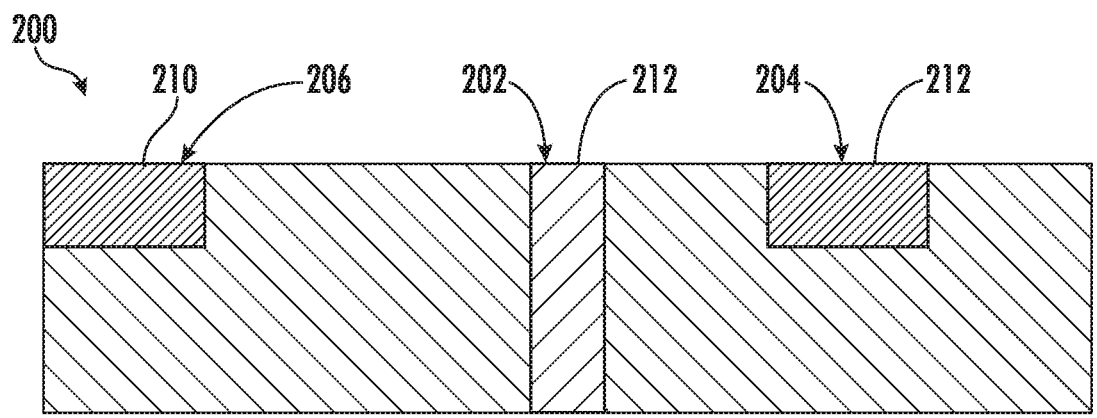
FIG. 7 is a cross-sectional view of the composite component taken generally about line 7-7 in FIG. 6, particularly illustrating plugs installed within features of the component.

Furthermore, as shown in FIG. 3, at (106), the method 100 includes installing a plug within a feature defined by the composite component. For example, as shown in FIG. 7, in the illustrated embodiment, plugs 212 are installed within the hole 202 and the slot 204 defined by the component 200. Such plugs 212 may entirely fill or occupy the hole 202 and the slot 204. Thus, when the component 200 is infiltrated as will be described below, the plugs 212 prevent the flow of the infiltrant into the hole 202 and the slot 204.

At (106), plugs 212 may be placed in any suitable features of the composite component 200. For example, in the embodiment shown in FIG. 7, plugs 212 are placed in every feature defined by the component 200 (i.e., both the hole 202 and the slot 204). However, in certain instances, it may not be necessary to install a plug 212 in every feature of the component 200. For example, some of the features of the component 200 may be sufficiently spaced apart from the repair region 206 such that infiltrant will not enter such features. In such instances, the plugs 212 may only be installed in features sufficiently close to the repair region 206 such that infiltrant will enter when no plug 212 is installed.

The plugs 212 are formed from one or more neutral materials, such as one or more bond resistant materials. As such, the plugs 212 do not chemically react with or otherwise bond to the infiltrant. Thus, as will be described below, the plugs 212 are able to be removed from the component 200 after infiltration. In general, the material(s) used to form the plugs 212 may be selected based on the processing temperature of the subsequent infiltration. For example, when the processing temperature is low, the plugs 212 may be formed from polytetrafluoroethylene (PTFE). Conversely, the plugs 212 may be formed from boron nitride when the processing temperature is high. However, in alternative embodiments, the plugs 212 may be formed from any other neutral material(s).

Moreover, in one embodiment, at (106), preformed or prefabricated plugs 212 are installed within the features of the component 200. In such an embodiment, the plugs 212 may be preformed (e.g., at a different facility) for quick installation within the features of the component 200. Such preformed plugs 212 may generally have the same shape and size as the features within which the plugs 212 will be installed. For example, in such an embodiment, the plugs 212 installed within the hole 202 and the slot 204 may generally have the same shapes and sizes as the hole 202 and the slot 204, respectively. The use of prefabricated plugs 212 reduces the time necessary to perform the method 100.

In another embodiment, at (106), one or more neutral particulate or powder materials are compacted within the features of the component 200 to form the plugs 212. For example, in such an embodiment, the hole 202 and the slot 204 may be filled within one or more neutral particulate materials. The particulate material(s) is subsequently compacted or otherwise compressed to form the plugs 212 within the hole 202 and the slot 204. Compacted particulate material(s) within the features of the component 200 to form the plugs 212 does not require knowledge of the size and shape of the features ahead of time to prefabricate the plugs 212.

In addition, as shown in FIG. 3, at (108), the method 100 includes infiltrating the composite component with an infiltrant to densify the repair region of the composite component. Specifically, after the plugs 212 have been installed at (106), the repair region 206 of the composite component 200 is infiltrated with a suitable infiltrant. During infiltration, the plugs 212 block the flow of the infiltrant into the hole 202 and the slot 204 of the composite component 200. The infiltrant densifies the repair material 210 present within the repair region 206, thereby forming new composite material within the repair region 206.

In several embodiments, at (108), the method 100 may include melt infiltrating the composite component 200. More specifically, as mentioned above, the component 200 may be formed from a SiC—SiC matrix composite. In such an embodiment, the repair material 210 corresponds to a silicon carbide preform and the infiltrant may correspond to silicon. Thus, at (108), molten silicon may be poured onto the repair material 210 present within the repair region 206. The molten silicon then infiltrates the repair material 210 by capillary pressure. A first portion of the silicon reacts with the carbon within the repair material 210. Moreover, a second portion of the carbon fills the voids within the repair material 210, thereby densifying the repair material 210. However, in alternative embodiments, any suitable type of infiltration may be used at (108).

In addition, after infiltrating the composite component, at (110), the method 100 includes removing the plug from the feature. For example, after the repair material 210 has been infiltrated at (108), the plugs 212 are removed from the hole 202 and the slot 204. In one embodiment, the plugs 212 are mechanically removed, such as by pulling the plugs 212 out by hand or with pliers. In another embodiment, the plugs 212 are chemically removed, such as via a chemical washout. After the plugs 212 are removed, the hole 202 and the slot 204 have their pre-repair configuration (e.g., size and shape) without the need for any post-repair machining, grinding, or the like.

Figure 8:
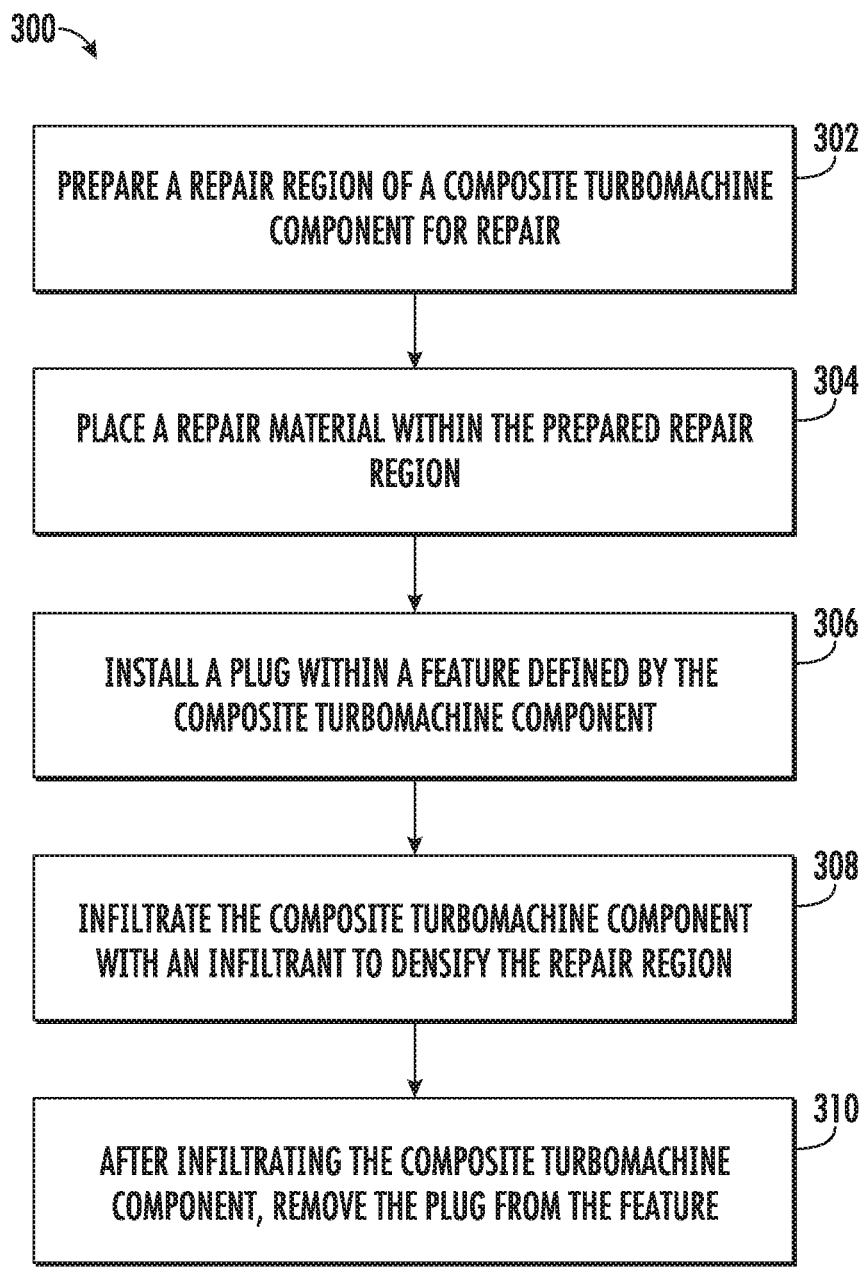
FIG. 8 is a flow diagram of one embodiment of a method for repairing composite turbomachine components.

FIG. 8 is a flow diagram of one embodiment of a method 300 for repairing composite turbomachine components. Although FIG. 8 depicts steps performed in a particular order, the disclosed methods are not limited to any particular order or arrangement. As such, the various steps of the disclosed methods can be omitted, rearranged, combined, and/or adapted in various ways without deviating from the scope of the present disclosure.

In several embodiments, the method 300 may be used to repair a composite component(s) of the engine 10. For example, in some embodiments, composite component(s) correspond to a compressor vane(s) 44, a compressor blade(s) 46, a turbine vane(s) 52, a turbine blade(s) 54, and/or a shroud block(s) 72 of the engine 10. However, in alternative embodiments, the composite component(s) may correspond to any suitable component(s), such as other component(s) of a turbomachine or component(s) of any other turbomachine.

As shown in FIG. 8, at (302), the method 300 may include preparing a repair region of a composite turbomachine component for repair. Additionally, at (304), the method 300 includes placing a repair material within the prepared repair region. Furthermore, at (306), the method 300 includes installing a plug within a feature defined by a composite turbomachine component. Moreover, at (308), the method 300 includes infiltrating the composite turbomachine component with an infiltrant to densify the repair region of the composite turbomachine component. In addition, after infiltrating the composite turbomachine component, at (310), the method 300 includes removing the plug from the feature.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

Further aspects of the invention are provided by the subject matter of the following clauses:

A method for repairing composite components, the method comprising: installing a plug within a feature defined by a composite component, the plug formed from one or more neutral materials; infiltrating the composite component with an infiltrant to densify a repair region of the composite component, the plug blocking a flow of the infiltrant into the feature; and after infiltrating the composite component, removing the plug from the feature.

The method of one or more of these clauses, wherein installing the plug comprises installing a preformed plug within the feature defined by the composite component.

The method of one or more of these clauses, wherein installing the plug comprises compacting one or more neutral particulate powder material within the feature to form the plug.

The method of one or more of these clauses, wherein the plug entirely fills the feature defined by the composite component.

The method of one or more of these clauses, wherein removing the plug from the feature comprises chemically removing the plug the from the feature defined by the composite component.

The method of one or more of these clauses, wherein removing the plug from the feature comprises mechanically removing the plug the from the feature defined by the composite component.

The method of one or more of these clauses, wherein the plug is formed from a bond resistant material.

The method of one or more of these clauses, wherein the plug is formed from boron nitride.

The method of one or more of these clauses, wherein the plug is formed from polytetrafluoroethylene.

The method of one or more of these clauses, wherein the feature comprises a hole.

The method of one or more of these clauses, wherein the feature comprises a slot.

The method of one or more of these clauses, wherein infiltrating the composite component comprises melt infiltrating the composite component with the infiltrant to densify the repair region of the composite component.

The method of one or more of these clauses, further comprising: positioning a repair material on the repair region of the composite component before infiltrating the composite component with the infiltrant.

The method of one or more of these clauses, wherein the repair material comprises silicon carbide and the infiltrant comprises silicon.

A method for repairing composite turbomachine components, the method comprising: installing a plug within a feature defined by a composite turbomachine component, the plug formed from one or more neutral and bond resistant materials; infiltrating the composite turbomachine component with an infiltrant to densify a repair region of the composite turbomachine component, the plug blocking a flow of the infiltrant into the feature; and after infiltrating the composite turbomachine component, removing the plug from the feature.

The method of one or more of these clauses, wherein the composite turbomachine component comprises a gas turbine engine vane, a gas turbine engine blade, or a gas turbine engine shroud block.

The method of one or more of these clauses, wherein installing the plug comprises installing a preformed plug within the feature defined by the composite component.

The method of one or more of these clauses, wherein installing the plug comprises compacting one or more neutral particulate powder material within the feature to form the plug.

The method of one or more of these clauses, wherein removing the plug from the feature comprises chemically removing the plug the from the feature defined by the composite turbomachine component.

The method of one or more of these clauses, wherein removing the plug from the feature comprises mechanically removing the plug the from the feature defined by the composite turbomachine component.

What is claimed is:

1. A method for repairing composite components, the method comprising:
    filling a feature defined by a composite component with one or more neutral particulate materials;
    compacting the one or more neutral particulate materials to form a plug within the feature;
    infiltrating the composite component with an infiltrant to densify a repair region of the composite component, the plug blocking a flow of the infiltrant into the feature; and
    after infiltrating the composite component, removing the plug from the feature.

2. The method of claim 1, wherein the plug entirely fills the feature defined by the composite component.

3. The method of claim 1, wherein removing the plug from the feature comprises chemically removing the plug from the feature defined by the composite component.

4. The method of claim 1, wherein removing the plug from the feature comprises mechanically removing the plug from the feature defined by the composite component.

5. The method of claim 1, wherein the one or more neutral particulate materials include a bond resistant material.

6. The method of claim 5, wherein the one or more neutral particulate materials include boron nitride.

7. The method of claim 5, wherein the one or more neutral particulate materials include polytetrafluoroethylene.

8. The method of claim 1, wherein the feature comprises a hole.

9. The method of claim 1, wherein the feature comprises a slot.

10. The method of claim 1, wherein infiltrating the composite component comprises melt infiltrating the composite component with the infiltrant to densify the repair region of the composite component.

11. The method of claim 1, further comprising:
    positioning a repair material on the repair region of the composite component before infiltrating the composite component with the infiltrant.

12. The method of claim 11, wherein the repair material comprises silicon carbide and the infiltrant comprises silicon.

13. A method for repairing composite turbomachine components, the method comprising:
    filling a feature defined by a composite turbomachine component with one or more neutral and bond resistant particulate materials;
    compacting the one or more neutral and bond resistant particulate materials to form a plug within the feature;
    infiltrating the composite turbomachine component with an infiltrant to densify a repair region of the composite turbomachine component, the plug blocking a flow of the infiltrant into the feature; and after infiltrating the composite turbomachine component, removing the plug from the feature.

14. The method of claim 13, wherein the composite turbomachine component comprises a gas turbine engine vane, a gas turbine engine blade, or a gas turbine engine shroud block.

15. The method of claim 13, wherein removing the plug from the feature comprises chemically removing the plug the from the feature defined by the composite turbomachine component.

16. The method of claim 13, wherein removing the plug from the feature comprises mechanically removing the plug the from the feature defined by the composite turbomachine component.

17. The method of claim 13, wherein the plug entirely fills the feature defined by the composite turbomachine component.

18. The method of claim 13, wherein the one or more neutral particulate materials include a bond resistant material.

19. The method of claim 18, wherein the one or more neutral particulate materials include boron nitride.

20. The method of claim 18, wherein the one or more neutral particulate materials include polytetrafluoroethylene.

* * * * *